United States Patent [19]

Suehiro et al.

[11] Patent Number: 5,508,896
[45] Date of Patent: Apr. 16, 1996

[54] AIMING MECHANISM FOR VEHICULAR HEADLAMP

[75] Inventors: Yoshio Suehiro; Katutada Shirai, both of Shizuoka, Japan

[73] Assignee: Koito Manufacturing Co., Ltd., Tokyo, Japan

[21] Appl. No.: 365,552

[22] Filed: Dec. 28, 1994

[30] Foreign Application Priority Data

Dec. 28, 1993 [JP] Japan .................................. 5-334557

[51] Int. Cl.⁶ ............................................ B60Q 1/068
[52] U.S. Cl. .................... 362/66; 362/289; 362/424; 74/89.13; 74/89.15
[58] Field of Search ................. 74/89.13, 89.15; 362/66, 285, 289, 422, 423, 424, 419, 61, 69

[56] References Cited

U.S. PATENT DOCUMENTS

| | | | |
|---|---|---|---|
| 4,674,018 | 6/1987 | Ryder et al. | 362/424 |
| 4,843,523 | 6/1989 | Nakamura | 362/69 |
| 4,930,367 | 6/1990 | Nagasawa | 74/416 |
| 4,939,945 | 7/1990 | Ryder et al. | 74/89.13 |
| 5,079,676 | 1/1992 | Lisak | 362/66 |
| 5,161,877 | 11/1992 | Wright et al. | 362/66 |
| 5,258,894 | 11/1993 | Bivens | 362/66 |
| 5,260,857 | 11/1993 | Lukkarinen et al. | 362/66 |
| 5,309,780 | 5/1994 | Schmitt | 74/89.13 |
| 5,365,415 | 11/1994 | Schmitt et al. | 362/66 |

Primary Examiner—Denise L. Gromada
Assistant Examiner—Alan B. Cariaso
Attorney, Agent, or Firm—Sughrue, Mion, Zinn, Macpeak & Seas

[57] ABSTRACT

An automobile headlamp aiming mechanism including a tilting member supported on a stationary member so as to be capable of tilting and defining the illumination angle of the headlamp beam. A cylindrical nut member is rotatably supported by a bearing formed on the stationary member. An aiming screw threadedly joined with the nut member extends forward and backward in threaded connection with the nut member, the aiming screw being prevented from moving with respect to the nut member, and moving forward and backward in the axial direction to tilt the tilting member. The aiming mechanism allows the nut member to rotate smoothly when a bevel gear formed on the nut member is engaged with a driver inserted in a direction at a right angle with respect to the longitudinal axis of the aiming screw. Concavo-convex engaging parts for engaging the nut member with the bearing are provided on predetermined confronting faces in sliding contact between the bearing and the nut member, the nut member engaging parts operating to prevent the nut member from rotating in response to vibration or the like. The nut member is supported elastically in the axial direction in such a manner that the engagement of the engaging parts is released by the thrust generated when the nut member is rotated.

20 Claims, 7 Drawing Sheets

AIMING MECHANISM FOR VEHICULAR HEADLAMP

BACKGROUND OF THE INVENTION

The present invention relates to an aiming mechanism for a vehicular headlamp.

FIG. 12 and FIG. 13 illustrate a conventional aiming mechanism for a movable unit type vehicular headlamp. In the conventional aiming mechanism, a lamp body reflector unit 2, which has a light source mounted therein and is a tiltable member whose tilt angle defines the illumination angle of the headlamp beam, is supported at a point in the front of a lamp housing 1, which is a stationary member, by a tilting pivot (not shown) and by an aiming screw 3, which can move forward and backward in its axial direction. The lamp housing 1 is provided with a gear case 1a. In this gear case 1a, a nut member 4, which is threadedly joined with the aiming screw 3 extending to the front and penetrating forward and backward through the lamp housing 1, is supported in such a manner that the nut member 4 is enabled to rotate. At the front end portion of the aiming screw 3, a ball part 3a is formed and connected to a ball receiving part 2a, thus being prevented from rotating. Reference numeral 3b indicates an engaging part provided between the ball part 3a and the ball receiving part 2a for preventing the aiming screw from rotating.

Further, a bevel gear 5 is formed in a unified structure on the outer circumference of the nut member 4. A bevel gear 7, which meshes with the bevel gear 5, is provided on an operating shaft 6, which, being supported on the gear case 1a in such a manner as to be enabled to rotate, extends upward while crossing at right angles with the aiming screw 3. When the operating shaft 6 is rotated, the nut member 4 is rotated by way of the bevel gears 7 and 5. The aiming screw 3, which is prevented from rotating, thus moves forward or backward in the axial direction (i.e., in the direction indicated by an arrow), causing the ball receiving part 2a to move forward or backward, and hence tilting the lamp body reflector unit 2 around the pivot, whereby an adjustment is made of the aiming angle of the headlamp beam.

However, the conventional construction discussed above requires a pair of bevel gears 5 and 7 and a separate operating shaft 6. This presents a problem in that a large number of component parts are required, entailing a high cost.

Moreover, it is desirable for the aiming screw to move forward and backward in a smooth manner when the operating shaft 6 is rotated, for which purpose the operating shaft 6 and the nut member 4 must rotate smoothly. The sliding surfaces between the operating shaft 6 and the nut member 4 and the gear case 1a are made smooth so that the sliding friction therebetween is reduced to as small a value as possible. On the other hand, if smooth rotation is provided among the operating shaft 6, the nut member 4, and the aiming screw 3, there is a problem that the illumination angle of the headlamp tends eventually to come out of adjustment because vibration transmitted via the vehicle body can cause the nut member 4 and the operating shaft 6 to rotate, causing the aiming screw 3 to move forward or backward.

SUMMARY OF THE INVENTION

The present invention has been made in view of the problems found in the conventional headlamp aiming mechanism, and it is an object of the present invention to provide an automobile headlamp aiming mechanism having a simple construction and yet which is capable of preventing the aiming screw from moving forward or backward undesirably such as in response to vibration transmitted to the mechanism from the vehicle body.

In order to overcome the problems described above, the automobile headlamp aiming mechanism of the present invention is provided with a tilting member supported on a stationary member so as to be capable of tilting and defining the illumination angle of the headlamp beam, a nut member formed in a cylindrical shape and supported by a bearing formed on the stationary member in such a manner that the nut member is enabled to rotate around an aiming screw with which it is theadedly joined and which has a forward end joined to the tilting member, the aiming screw, extending forward and backward and being prevented from rotating in relation to the nut member, moving forward and backward in the axial direction to tilt the tilting member when the nut member is rotated.

The motor vehicle headlamp aiming mechanism is characterized in that a single bevel gear is formed on the nut member and is engageable with the teeth of a driver inserted in a direction at a right angle to the longitudinal axis of the aiming screw, in that a nut member engaging means, which engages the nut member with the bearing by engaging the nut member in the axial direction, is provided on predetermined opposing faces in sliding contact between the bearing and the nut member, and also in that the nut member is elastically supported in such a manner that the engagement of the nut member engaging means is released when the nut member slides in the direction of the thrust force which occurs when the driver is rotated.

In the motor vehicle headlamp aiming mechanism of another aspect of the present invention, the nut member engaging means is constructed with engaging portions formed of small concavo-convex parts formed at a uniform pitch in the circumferential direction on the confronting faces in sliding contact between the nut member and the bearing and mutually engaging one another in the axial direction.

Since the nut member is directly rotated by means of a driver, the aiming mechanism according to the present invention does not require a separate operating shaft for rotating the nut member or a bevel gear at the driving side, and the mechanism can therefore be formed of a correspondingly smaller number of component parts.

When vibration from the vehicle body is transmitted to the aiming mechanism, the nut member can rotate around the aiming screw, but the nut member engaging means, which is provided between the confronting faces in sliding contact between the nut member and the bearing, secures the nut member in engagement with the bearing (by mutual engagement of the small concavo-convex engaging parts formed between the nut member and the bearing), thereby preventing the nut member from rotating.

Further, when the driver is rotated with the teeth of the driver engaged with the teeth of the bevel gear so that the nut member rotates, the thrust of the driver acts on the nut member, the thrust causing the nut member, which is supported elastically, to slide in the direction in which the thrust acts, with the result that the nut member is released from engagement by the nut member engaging means provided on the confronting surfaces in sliding contact between the nut member and the bearing (i.e., released from engagement by the small concavo-convex engaging parts formed between the nut member and the bearing), so that it is possible for the nut member to rotate in relation to the bearing.

DESCRIPTION OF THE PREFERRED EMBODIMENTS

Preferred embodiments of the present invention will now be described with reference to the accompanying drawings.

Figure 1:
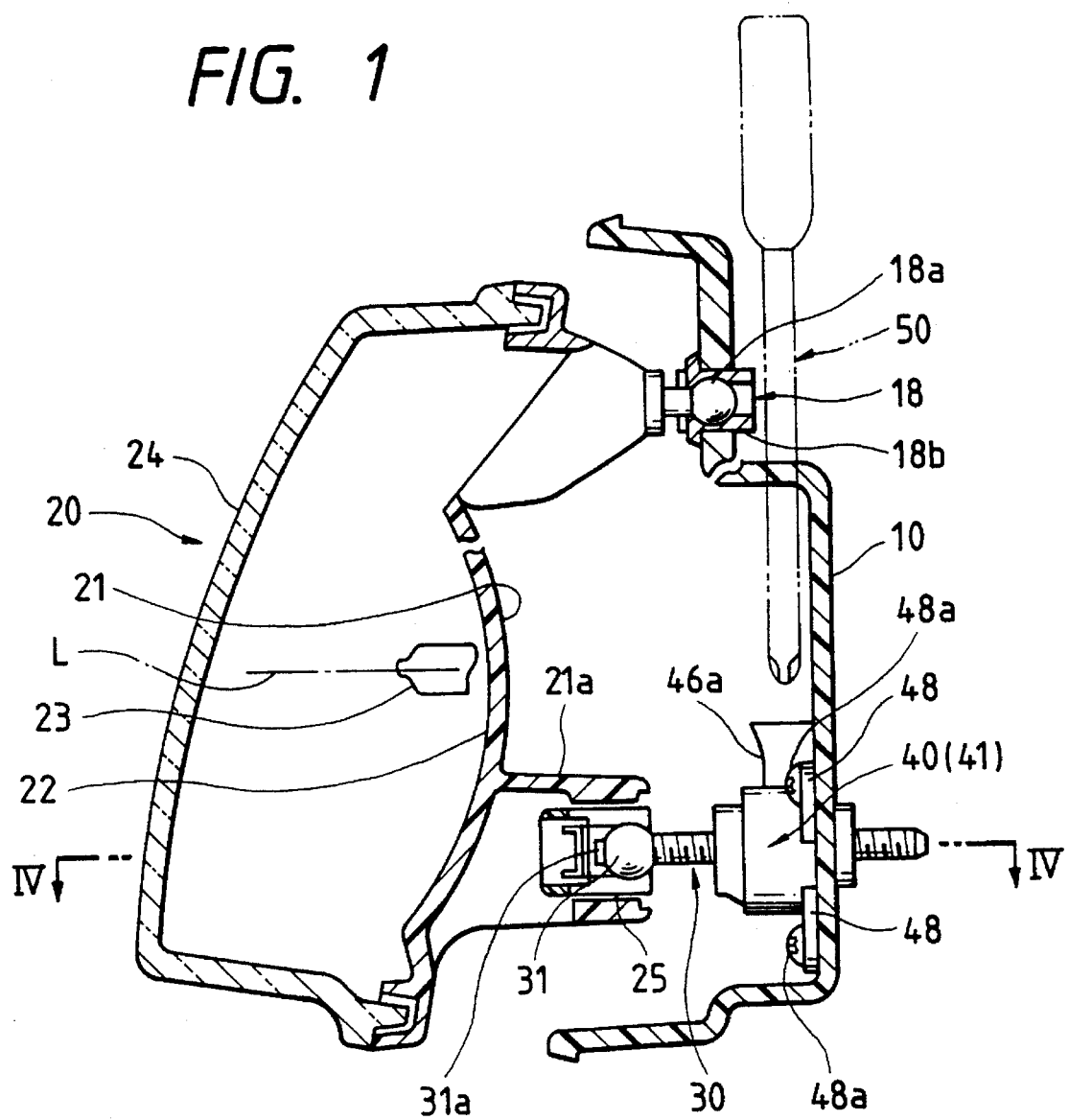
FIG. 1 is a vertical sectional view illustrating an aiming mechanism for an automobile headlamp constructed in accordance with a first example of a preferred embodiment of the present invention.
Figure 2:
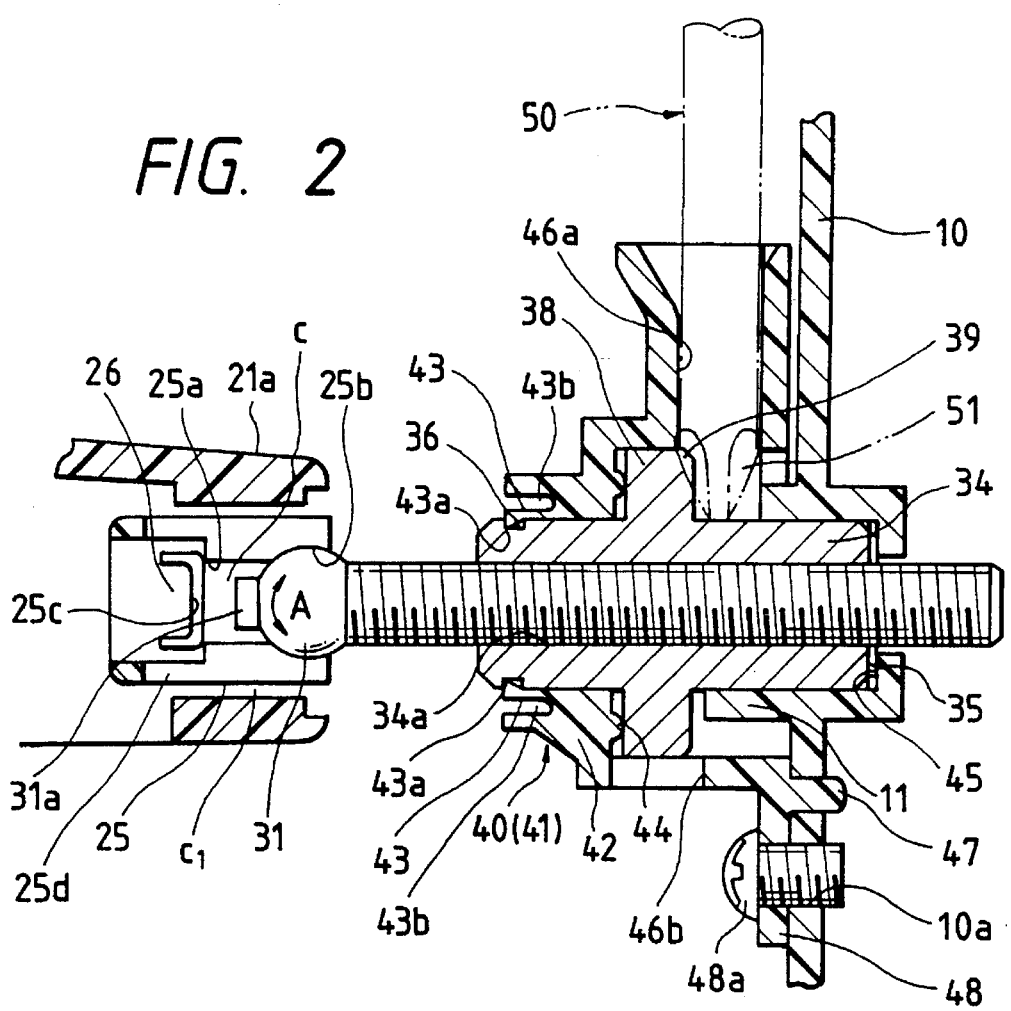
FIG. 2 is an enlarged vertical sectional view illustrating an area in the proximity of the aiming screw supporting part in the aiming mechanism of FIG. 1.
Figure 3:
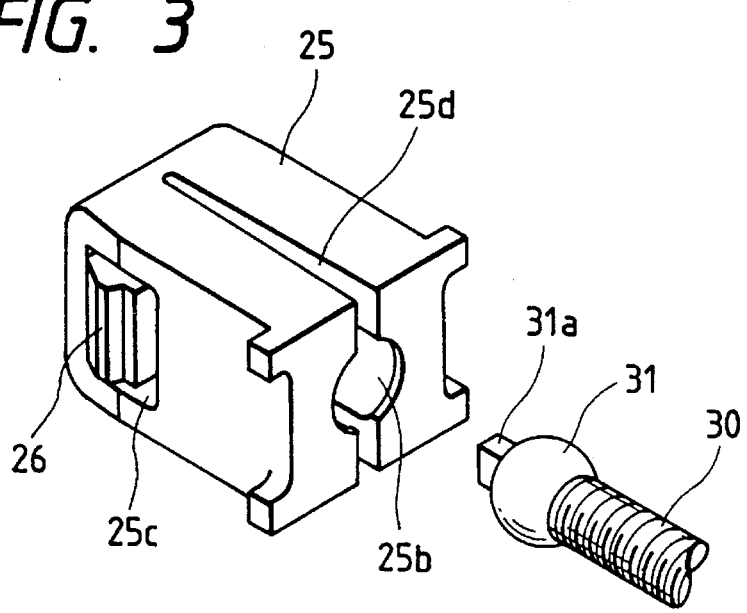
FIG. 3 is an exploded perspective view illustrating a ball part formed at the top portion of the aiming screw and a ball receiving member which supports the ball part in a state in which the ball part is prevented from rotating.
Figure 4:
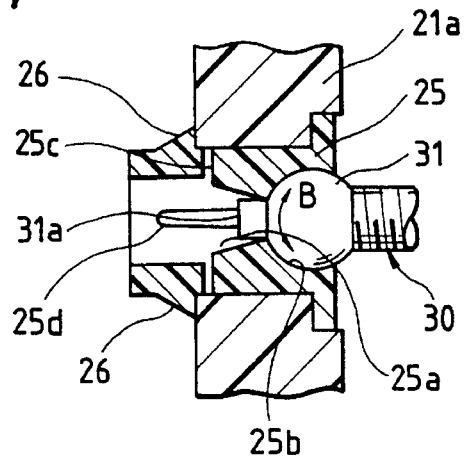
FIG. 4 is a horizontal sectional view illustrating the ball receiving member (in a sectional plane taken along a line IV—IV indicated in FIG. 1)
Figure 5:
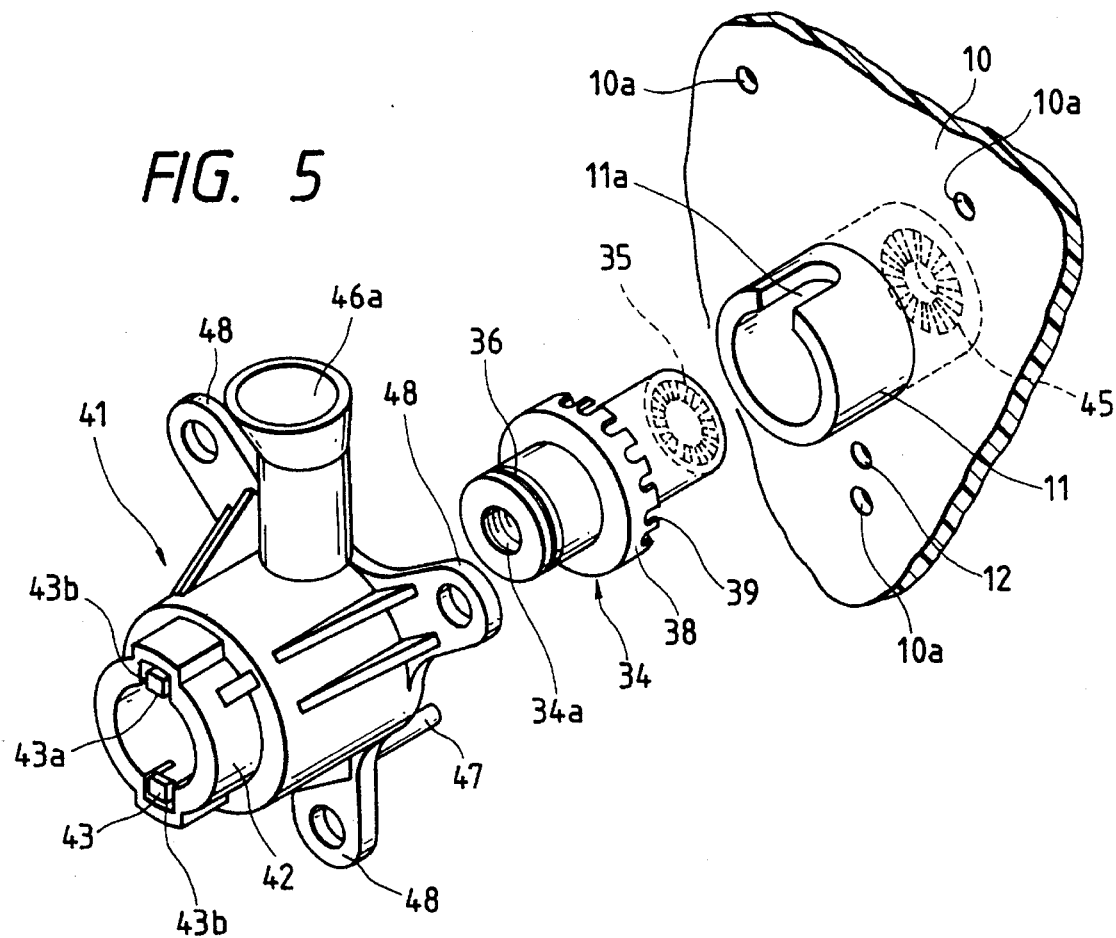
FIG. 5 is an exploded perspective view illustrating the same aiming screw supporting part.
Figure 6:
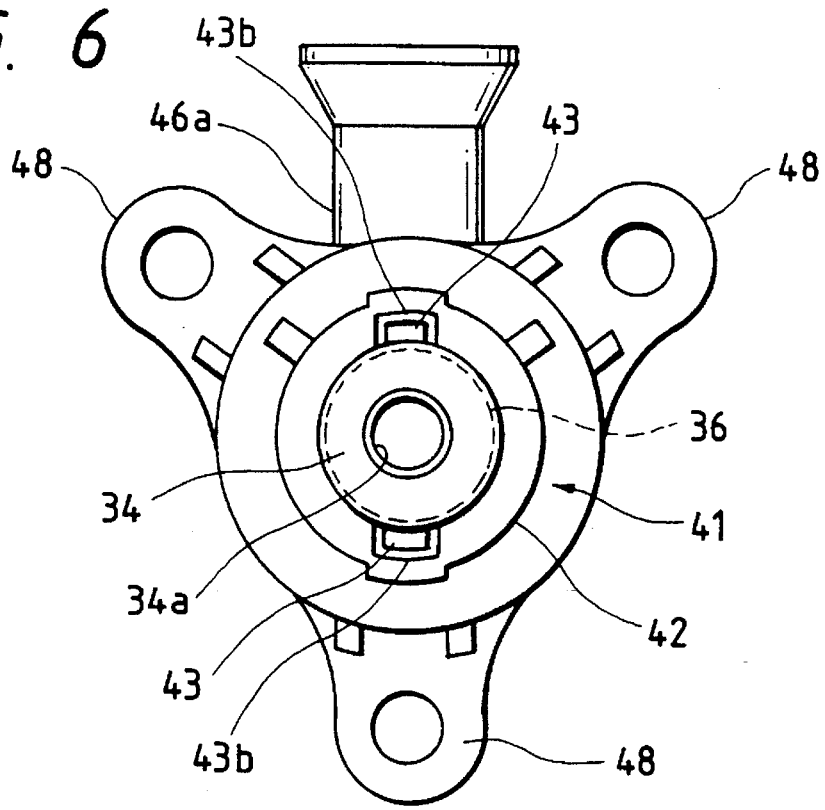
FIG. 6 is a front view illustrating the same aiming screw supporting part.
Figure 7:
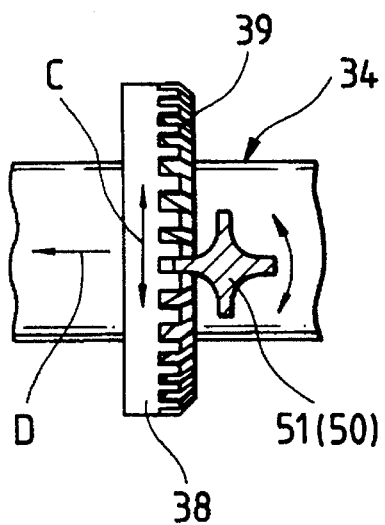
FIG. 7 is an illustration for a description of the force acting on the nut member when the driver is rotated.

FIG. 1 through FIG. 7 are drawings illustrating a first embodiment of the present invention. Of these, FIG. 1 shows a vertical section of an aiming mechanism for an automobile headlamp. FIG. 2 presents an enlarged vertical sectional view showing the construction in the proximity of the supporting part for the aiming screw in the same aiming mechanism. FIG. 3 is an exploded perspective view showing the ball part at the top portion of the aiming screw and a ball receiving member supporting the ball part in a state in which the ball part is prevented from rotating. FIG. 4 is a horizontal sectional view illustrating the ball receiving part (in a sectional view taken along the line IV—IV indicated in FIG. 1). FIG. 5 is an exploded perspective view showing the same aiming mechanism. FIG. 6 is a front view of the supporting part for the same aiming screw. FIG. 7 is a drawing illustrating the force (i.e., thrust) which occurs on the nut member at the time when the driver is rotated.

In these drawings, reference number 10 denotes a lamp housing made of synthetic resin. The lamp housing is a stationary member. A lamp body reflector unit 20, which is a tiltable member defining the illumination angle of the headlamp (i.e., the optical axis L of the lamp), is supported in such a manner as to enable it to tilt. For this purpose, there is provided an aiming screw 30 made of metal for adjustment of the upward and downward tilt angle of the unit 20, another aiming screw (not shown) made of the same material as that of the aiming screw A for adjustment of the tilt angle of the unit 20 in the left and right directions, and a ball joint 18, which has a ball part 18a and a tilting pivot at the reflector unit side and a ball supporting part 18b at the lamp housing side.

The reflector unit 20 includes a lamp body 21 made of synthetic resin, a reflector 22 having an inner surface in a parabolic shape and formed in a structure unified with the lamp body 21, a bulb 21 forming a light source and disposed at the focal position of the reflector 22, and a front lens 24 mounted in the front opening part of the lamp body 21. All of these parts are integrated into a unified structure of the reflector unit 20.

A ball receiving member 25, which is made of synthetic resin and supports a ball part 31 formed at the forward end portion of the aiming screw 30, is set in a bracket 21a formed in an extended structure at the back surface of the reflector unit 20 (i.e., the lamp body 21).

A protrusion 31 formed in a vertically oblong shape in cross section is provided at the top end of the ball part 31 of the aiming screw 30. A ball receiving member 25, which has a pair of tongue-shaped elastic hook pieces 26 engaging a ball receiving member mounting hole formed in the bracket 21a thereby preventing disengagement therefrom, is provided with a ball seat 25b. The ball seat 25b supports the ball part 31 in such a manner as to enable it to move in relative rotation, and, with an engaging concave part 25a which is engaged with the protrusion 31a, confines the left and right sides of the protrusion 31a and thereby prevents the protrusion 31a from rotating. The engagement of these two parts, namely, the protrusion 31a and the engaging concave part 25a, combines the ball part 31 and the ball receiving member 25 into a unified structure around the shaft, while preventing the aiming screw 30 from rotating in relation to the lamp housing 10. That is, the protrusion 31a is in close contact with the engaging concave part forming wall at both the left side and the right sides in the position of the base of the protrusion 31a, but there is maintained a very minute clearance c in the vertical direction (i.e., in the upward-downward direction) and in the axial direction. The ball part 31 and the ball receiving member 25 are constructed in such a manner that they cannot rotate relative to one another in the horizontal direction (i.e. in the direction indicated by an arrow B in FIG. 4), but can rotate relative to one another by a predetermined amount in the vertical direction (i.e., in the direction indicated by an arrow A in FIG. 2).

As a result, the aiming mechanism according to the present invention is capable of tilting the reflector unit 20 in the upward direction or in the downward direction without generating excess stress between the ball part 31 and the ball receiving member 25 when the aiming screw is moved forward and backward in the axial direction.

Reference number 25c denotes a U-shaped slit for forming an elastic hook piece 26, and reference number 26d denotes a vertically extending slit formed in the ball receiving member 25 in order to make it possible to insert the ball part 31 under pressure into the ball seat 25b. In addition, a clearance $C_1$ in the upward-downward direction (see FIG. 2) for permitting inclination of the reflector 22 and the aiming screw 30 during an aiming adjustment is provided in the ball receiving member mounting hole formed in the bracket 21a.

The aiming screw 30 is threadedly joined with a nut member 34 made of metal and having a cylindrical shape, and which is supported in the lamp housing 10 in such a manner as to permit the nut member to rotate therein. The aiming screw 30 also passes through the lamp housing 10 and extends forward and backward thereof. Reference number 34a denotes a female screw portion of the nut member 34. The nut member 34 is supported on the bearing 40 provided in the lamp housing 10, and is also unified with a bevel gear 38 which meshes with the teeth 51 of a driver 50 inserted in a direction at a right angle to the aiming screw 30. When the driver is rotated, the nut member 34, which is prevented from moving in the forward direction or in the backward direction, is rotated around the aiming screw 30, whereby the aiming screw 30 moves forward or backward in the axial direction. The reflector unit 20 is thus tilted around the tilting pivot (i.e., the ball joint 18), whereby it is possible to adjust the illuminating axis of the headlamp.

At the rear end portion of the nut member 34 (i.e., the end portion at the left side in FIG. 2), concavo-convex teeth 35 with convex threaded portions extending in the radial direction are formed, while concavo-convex teeth 45, which engage with the concavo-convex teeth 35, are formed on the sliding contact surface at the side of the bearing 40, with which the rear end portion of the nut member is in sliding contact. With the concavo-convex teeth 35 and 45 engaged in the axial direction, the nut member 34 is prohibited from rotating arbitrarily in the circumferential direction. That is, the rear end portion of the nut member 34 and the small concavo-convex teeth 35 and 45 provided between the sliding contact surfaces form a nut member engaging structure, which engages the nut member 34 with the bearing 40. The concavo-convex teeth 35 at the nut member side engage the concavo-convex teeth 45 at the side of the bearing, such engagement inhibiting the nut member from rotating even if the nut member 34 is rotated arbitrarily in the circumferential direction as the result of vibration of the engine or the like transmitted to the nut member 34.

A concave groove 36 is formed on the outer circumference of the front end portion of the nut member 34, and the forward end hooks 43a of a pair of elastic hook pieces 43, which are formed on the inner circumferential rim of the cylindrical front end portion of the bearing 40, are engaged with the concave groove 36, holding the nut member 34 as accommodated in the bearing 40 and also supporting the nut member 34 with an elastic force at such a level as to enable the nut member 34 to slide forward (i.e., in the leftward direction in FIG. 2) in response to a force which acts to slide the nut member 34 in such a direction (i.e., in the leftward direction in FIG. 2). In other words, when a rotational force is transmitted from the teeth 51 of the driver 50 to the teeth 39 of the bevel gear 38 when the driver 50 is rotated, the force in the circumferential direction, indicated by an arrow C in FIG. 7, and the force in the axial direction, indicated by an arrow D (the two forces together constituting a thrust force) act on the nut member 34. Specifically, the nut member 34 is supported by such elastic force (i.e., the elastic force which the nut member 34 receives from the elastic hook piece 43) as will slide the nut member 34 forward (i.e., in the left direction in FIG. 2 and FIG. 7) in response to the thrust force just mentioned, releasing the engagement between the concavo-convex teeth 35 and 45, and hence that between the nut member 34 and the bearing 40.

Owing to this operating feature, the thrust which acts on the nut member 34 when the driver 50 rotates the nut member 34 causes the nut member 34 to slide forward (in the leftward direction in FIG. 2), pushing the elastic hook piece 43 so as to expand it. The concavo-convex teeth 35 at the side of the nut member 35 are thereby moved away from the concavo-convex teeth 45 at the side of the bearing, so that the nut member 34 can rotate smoothly and thereby move the aiming screw 30 smoothly forward or backward in the axial direction.

Reference number 44 denotes a convex thread portion formed in a ring shape on the circumference of the surface in sliding contact at the bearing side with the surface at the side opposite the surface on which teeth are formed on the bevel gear 38. This convex thread portion 44 reduces the resistance due to the sliding friction between the bearing 40 and the bevel gear 38, thereby contributing to smooth rotation of the nut member 34.

Reference number 46a denotes a driver guide, which is formed in the shape of a perpendicular hole communicating with the inside of the bearing 40. When the driver 50 is inserted from an upper position into the driver guide 46a, the teeth 51 of the driver engage with the teeth 39 on the bevel gear.

Reference number 46b denotes a water drain port provided in a position just under the bevel gear 38 in the bearing 40. The water drain port 46b is designed to discharge water which has intruded into the mechanism through the driver guide 46a.

The bearing 40 is formed of a cylinder-shaped protruding part 11, which is formed in the front surface of the lamp housing 10, and a cylindrically shaped front end portion 42, which is a part of the bearing member 41 assembled on and fixed to the lamp housing 10 in such a manner as to surround the cylindrically shaped protruding part 11. The cylindrically shaped front end portion 42 of the bearing member 41 and the cylindrically shaped protruding part 11 of the lamp housing 10 are constructed so as respectively to support the front and rear end portions of the nut member 34.

Further, a space 43b, which has a U shape in lateral cross section with an opening formed forward and inward, is provided in the periphery of a part of the inner circumferential wall at the side of the opening of the cylindrically shaped front end portion 42 of the bearing member 41. A portion of the inner circumferential wall which is enclosed in this space 43b and extends forward and backward forms an elastic hook piece 43 which can move in the radial direction.

Reference number 47 denotes a positioning pin which protrudes from the bearing member 41, and reference number 12 denotes an engaging hole formed in the lamp housing side and which is engaged by the pin 47 when inserted therein. It is thus possible to position the bearing member 41 in relation to the lamp housing 10 (the cylinder-shaped protruding part 11) with the pin 47 inserted into the hole 12. Reference number 48 denotes a flange-shaped bracket formed on the bearing member 41 extending therefrom. The bracket 48 (i.e., the bearing member 41) can be fixed to the lamp housing 10 by screwing the fixing screw 48a into the screw hole 10a in the lamp housing 10. Reference number 11a denotes a notch formed in the cylindrically shaped protruding part 11. The top portion of the driver 50 inserted into the driver guide 45 can directly contact the nut member 34.

Figure 8:
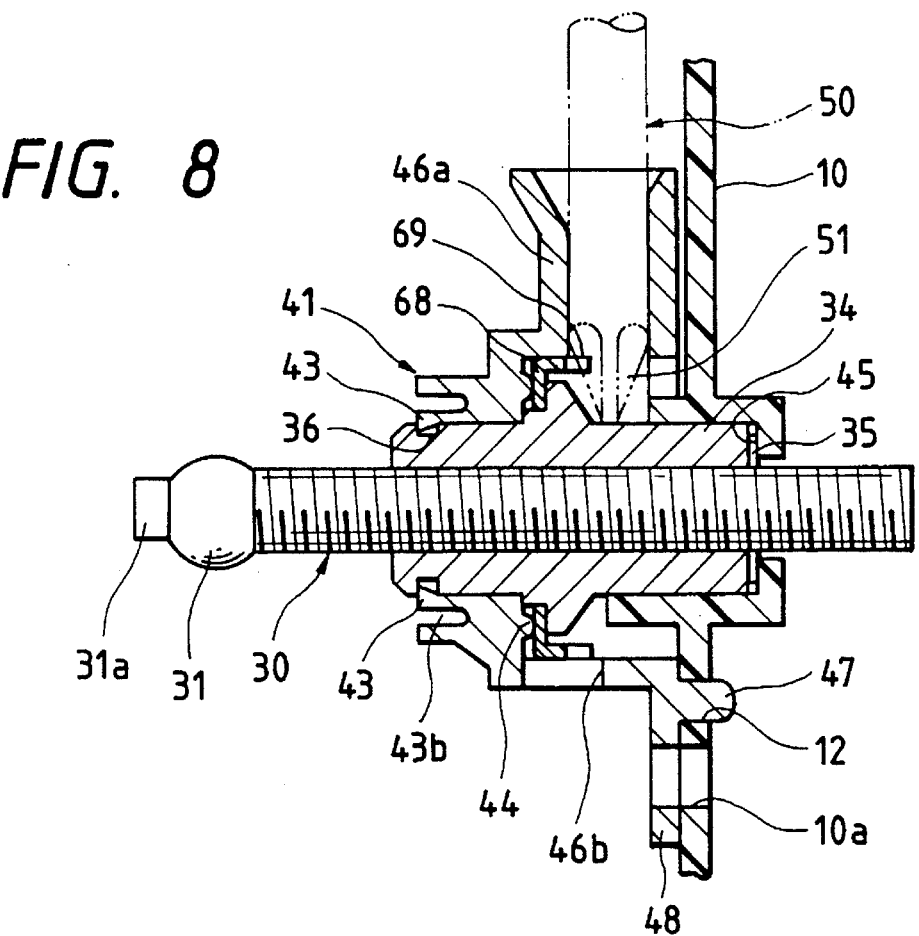
FIG. 8 is an enlarged vertical sectional view showing the aiming screw supporting part in the aiming mechanism for an automobile headlamp of a second example of a preferred embodiment of the present invention.
Figure 9:
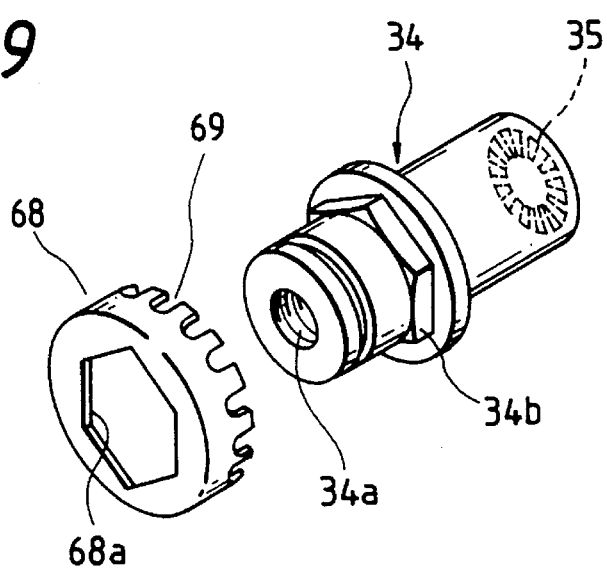
FIG. 9 is an exploded perspective view illustrating the nut member, which is a principal part of the aiming screw supporting part of FIG. 8.

FIG. 8 and FIG. 9 respectively illustrate a second embodiment of the present invention, of which FIG. 8 is an enlarged vertical sectional view illustrating the aiming screw bearing part, which is an essential part of the aiming mechanism for a headlamp, and FIG. 8 is an exploded perspective view illustrating the nut member.

In the first embodiment described above, the nut member and the bevel gear 38 are formed in a unified structure. In the second embodiment, however, the nut member 34 is formed in a structure with a separate crown gear 68 engaged with the nut member 31. Reference number 68a denotes a hexagonal hole in the crown gear 68, and reference number 34b denotes an engaging part formed on the outer circumference of the nut member 34 for engaging the hexagonal hole in the crown gear 68. The crown gear 68, when engaged with the hexagonal hole engaging part 34b, is held in a state of contact under pressure with the convex part 44 at the bearing side, the nut member 34 and the crown gear 68 being thereby engaged with each other so as to be held in a unified structure.

Figure 10:
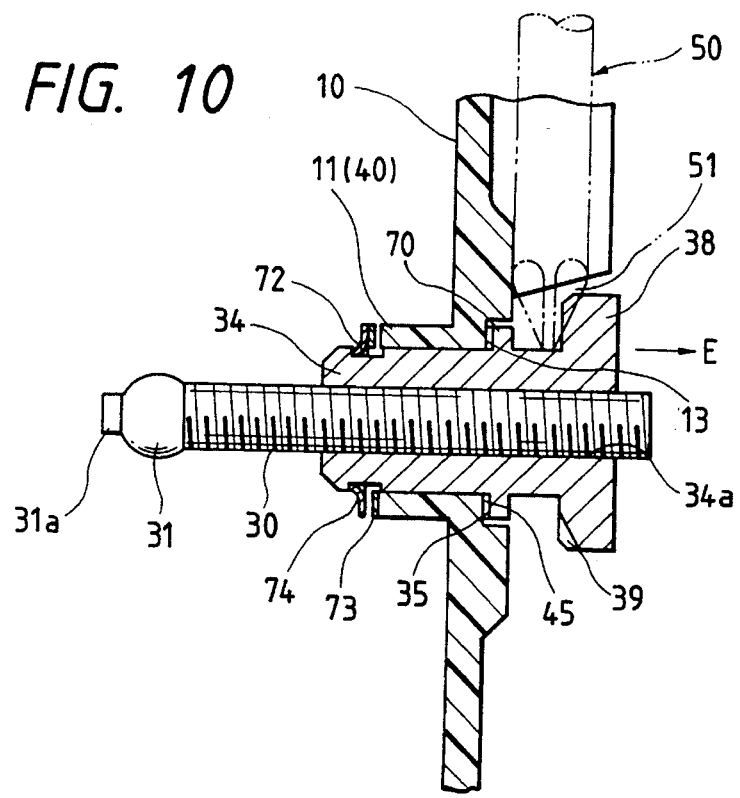
FIG. 10 is an enlarged vertical sectional view showing the aiming screw supporting part in the aiming mechanism for an automobile headlamp of a third example of a preferred embodiment of the present invention.
Figure 11:
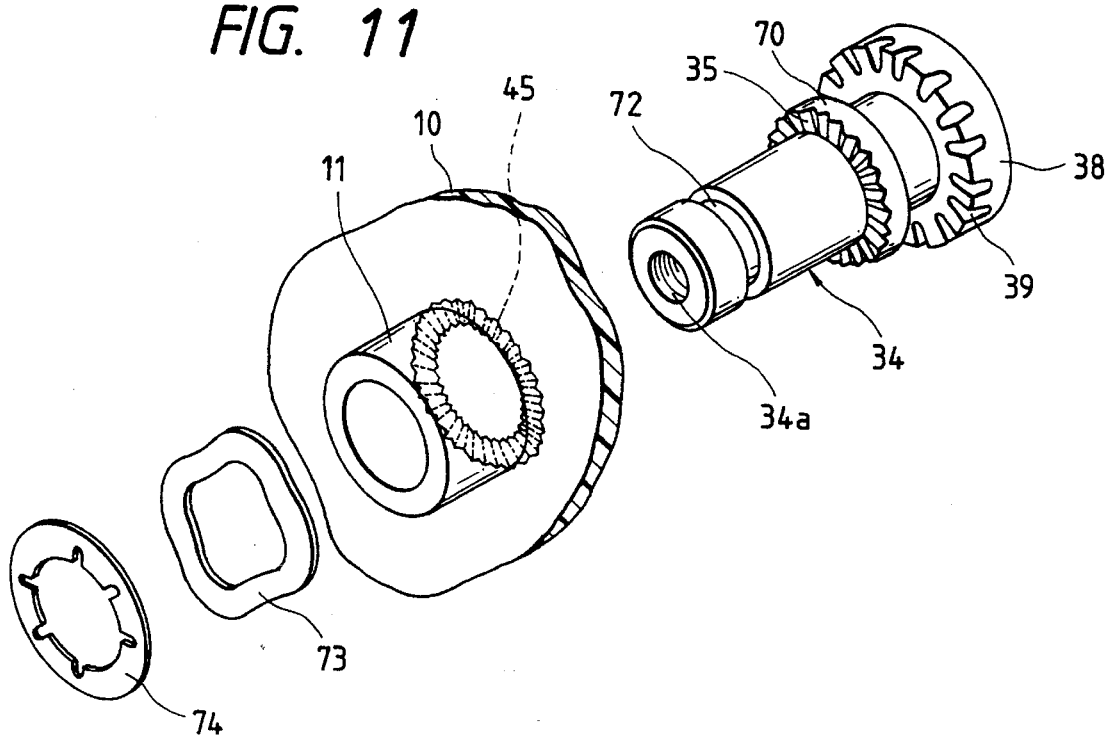
FIG. 11 is an exploded perspective view illustrating the nut member, which is a principal part of the aiming screw supporting part of FIG. 10.
Figure 12:
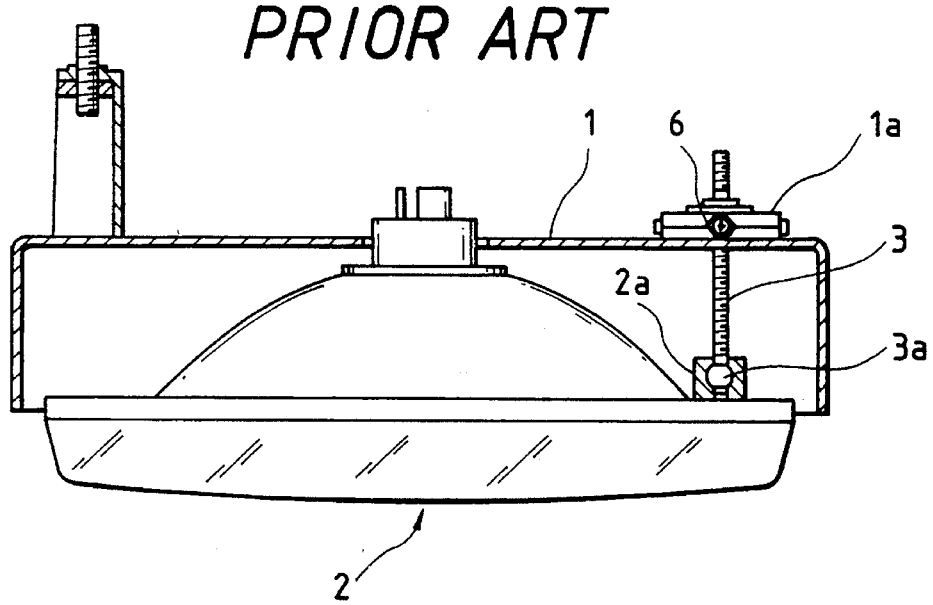
FIG. 12 is a vertical sectional view illustrating a prior art aiming mechanism for an automobile headlamp.
Figure 13:
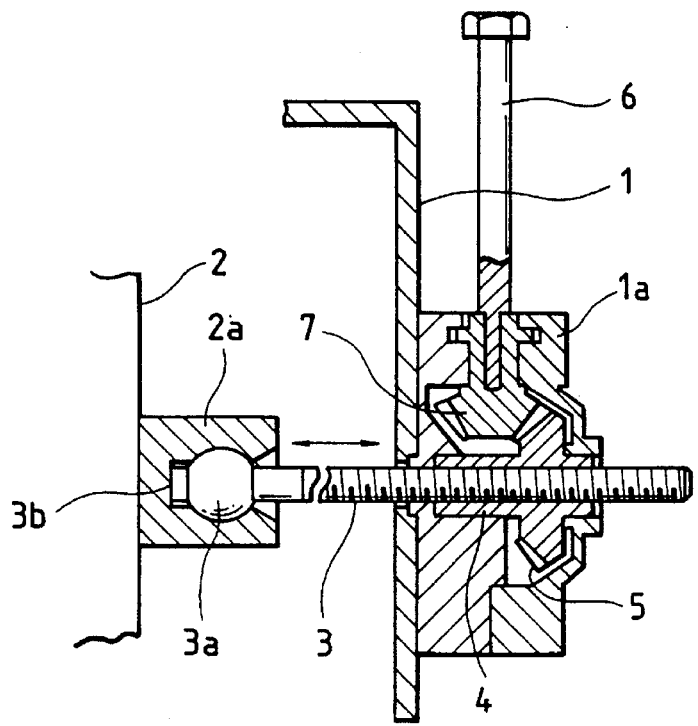
FIG. 13 is an enlarged sectional view illustrating principal parts of the prior art aiming mechanism shown in FIG. 12.

FIG. 10 and FIG. 11 respectively illustrate a third embodiment of the present invention, of which FIG. 10 is an enlarged vertical sectional view showing the aiming screw supporting part for the aiming mechanism for the headlamp and FIG. 11 is an exploded perspective view showing the aiming screw supporting part.

In the two embodiments described above, a bevel gear 38 is provided approximately at the middle of the nut member 34 in the axial direction, and the nut member 34 is disposed in such a manner that the bevel gear 38 is set in a position forward of the lamp housing 10 with the teeth 39 of the bevel gear directed toward the rear (i.e., toward the side where the lamp housing 10 is located). However, in the third embodiment, a bevel gear 38 is formed in a unified structure at the rear end portion of the nut member 34 (i.e., at the end portion at the right side shown in FIG. 10), and a nut member 34 is disposed in such a manner that the bevel gear 38 is positioned at the rear of the lamp housing 10, with the teeth 39 arranged in such a form as to be directed forward (i.e., toward the side where the lamp housing 10 is located).

Reference number 70 is a flange part, which is formed in a structure unified with the nut member 34. With this flange part 70 held in sliding contact with the peripheral area 13 of an opening at the back surface side of the bearing 40 (i.e., the cylindrically shaped protruding part 11), the nut member 34 is positioned in the axial direction in relation to the bearing 40. On the confronting surfaces where the flange part 70 is in sliding contact with the hole periphery part 13, small concavo-convex teeth 35 and 45 are formed as a nut member engaging structure for engaging the nut member 34 with the bearing 40, thus inhibiting the nut member 34 from rotating.

Further, a convex groove 72 is formed on the surface on the outer circumference of the front end portion of the nut member 34, and a push-on fixing washer 74 is interposed via a wave washer 73 between the concave groove 72 and the front end surface of the cylinder-shaped protruding part 11, the nut member 34 being thereby prevented from falling off the bearing 40 while the small concavo-convex teeth 35 and 45 are urged in the direction for mutual engagement. Thus, this arrangement forms a construction which is capable of surely preventing the nut member 34 from rotating other than when desired.

Also in the third embodiment, thrust acting in the rightward direction (i.e., in the direction indicated by an arrow E in FIG. 10) is applied to the nut member 34 when the driver 50 is rotated, the nut member 34 being thereby caused to slide in the rightward direction in opposition to the urging force which the push-on fixing washer 74 and the wave washer 73 transmit to the nut member 34, thereby releasing the concavo-convex teeth 35 and 34 from engagement and allowing the nut member 34 to rotate smoothly.

The other parts of automobile headlamp aiming mechanism of the third embodiment are the same as those of the first embodiment, and hence a further detailed description of those parts is omitted here, with those parts being merely identified with the same reference numbers.

The nut member 34 in each of the embodiments described above is made of metal, but the nut member 34 may also be made of synthetic resin.

Furthermore, the nut member engaging structure, which is provided on the confronting surfaces in sliding contact between the nut member 34 and the bearing 40, is not limited to the small concavo-convex teeth 35 and 45 described above, but may be a satin finish surface with minute concavo-convex forms on the surface, or any other concavo-convex surface structure effective for preventing the nut member 34 from arbitrarily rotating by increasing the sliding friction on the surfaces in sliding contact.

Still further, the embodiments described above are discussed with reference to a movable reflector type headlamp in which the stationary member is the lamp housing and the tilting member is the lamp body reflector unit, but it should be noted that the present invention is not limited in any way to such a construction. That is, the present invention can be applied effectively to a headlamp of the movable reflector type, in which the stationary member is formed of the lamp body while the tilting member is formed of the reflector.

As is evident from the description given hereinabove, the aiming mechanism constructed in accordance with the present invention for an automobile headlamp can be formed with a simplified construction with a reduced number of component parts since the nut member is rotated directly by a driver. That is, there is no requirement for a separate operating shaft for rotating the nut member or a bevel gear at the driving side.

Further, the nut member engaging structure, which is provided on predetermined surfaces in sliding contact between the nut member and the bearing, engages the nut member with the bearing, thereby inhibiting the nut member from moving relatively, even though vibration transmitted via the vehicle body may tend to rotate the nut member around the aiming screw. Thus, the nut member is inhibited from rotating arbitrarily (i.e., the aiming screw is inhibited from arbitrarily moving forward or backward) unless the nut member is rotated positively by means of a driver. Hence, the aiming mechanism according to the present invention overcomes the problem that the illumination angle of the headlamp is undesirably misadjusted.

Moreover, when the nut member is rotated positively by using a driver, the thrust which acts on the nut member causes the nut member, which is supported elastically, to slide in the direction of the thrust, thereby releasing the nut member from engagement with the nut member engaging structure provided between the nut member and the bearing (i.e., the engagement of the nut member with the small concavo-convex engaging parts in the aiming mechanism), thereby making it possible to rotate the nut member and to carry out a smooth aiming adjustment.

What is claimed is:

1. A motor vehicle headlamp aiming mechanism comprising:

stationary member fixed to a vehicle body;

a tilting member supported on said stationary member for tilting and defining an illumination angle of a headlamp beam;

a cylindrical bearing means formed on said stationary member;

a cylindrical nut means accommodated in and rotatably supported by said bearing means;

an aiming screw threadedly joined with said nut means, a forward end portion of said aiming screw being joined to said tilting member, said aiming screw extending forward and backward in threaded connection with said nut means, said aiming screw being prevented from moving with respect to said nut means and moving forward and backward in an axial direction thereof for tilting said tilting member, in response to rotation of said nut means;

a bevel gear formed on said nut means and engageable with teeth of a driver inserted in a direction at a right angle to a longitudinal axis of said aiming screw; and nut engaging means for engaging said nut means with said bearing means in an axial direction, said nut engaging means being provided on predetermined opposing faces in sliding contact between said bearing means and said nut means; and means for elastically supporting said nut means in such a manner that engagement of said nut engaging means is released when said nut means slides in the direction of a thrust force caused when said driver is rotated.

2. The motor vehicle headlamp aiming mechanism according to claim 1, wherein said nut engaging means comprises engaging portions formed of small concavo-convex parts formed at uniform pitch in a circumferential direction on confronting faces in sliding contact between said nut means and said bearing means.

3. The motor vehicle headlamp aiming mechanism according to claim 1, wherein said nut means has a concave groove formed on an outer circumference thereof, and said bearing means comprises at least one elastic hook piece formed on an inner circumferential rim thereof, said hook piece engaging said concave groove.

4. The motor vehicle headlamp aiming mechanism according to claim 1, further comprising a projection formed on said bearing means and abutting a portion opposing said bevel gear.

5. The motor vehicle headlamp aiming mechanism according to claim 1, wherein said bearing means comprises a pair of front and rear cylindrical members respectively supporting a front end and a rear end of said nut means.

6. The motor vehicle headlamp aiming mechanism according to claim 1, wherein said nut means and said bevel gear are integrally formed.

7. The motor vehicle headlamp aiming mechanism according to claim 1, wherein said nut means and said bevel gear are separately formed.

8. The motor vehicle headlamp aiming mechanism according to claim 1, wherein said bevel gear is positioned inside said stationary member.

9. The motor vehicle headlamp aiming mechanism according to claim 1, wherein said bevel gear is positioned outside said stationary member.

10. The motor vehicle headlamp aiming mechanism according to claim 1, wherein said nut means is made of metal.

11. The motor vehicle headlamp aiming mechanism according to claim 1, wherein said nut means is made of synthetic resin.

12. The motor vehicle headlamp aiming mechanism according to claim 1, wherein said stationary member is a lamp housing and said tilting member is a lamp body.

13. The motor vehicle headlamp aiming mechanism according to claim 1, wherein said stationary member is a lamp body and said tilting member is a reflector.

14. A motor vehicle headlamp comprising:

stationary member fixed to a vehicle body;

a tilting member supporting on said stationary member for tilting and defining an illumination angle of a headlamp beam;

a bearing formed on said stationary member;

a cylindrical nut member accommodated in and rotatably supported by said bearing, said nut member and said bearing having opposing faces which, when engaged with one another, irrotationally couple said nut member to said bearing, said nut member being slidable with respect to said bearing to selectively engage and disengage said opposing faces;

an aiming screw threadedly joined with said nut member, a forward end portion of said aiming screw being joined to said tilting member, said aiming screw extending forward and backward in threaded connection with said nut member in such a manner that said aiming screw moves forward and backward in an axial direction thereof for tilting said tilting member in response to rotation of said nut member;

an elastic member urging said nut member in a direction to engage said opposing faces; and a gear formed on said nut member and engageable with teeth of a tool to rotate said gear.

15. The motor vehicle headlamp according to claim 14, wherein said opposing surfaces comprise engaging portions formed of small concavo-convex parts formed at a uniform pitch in a circumferential direction.

16. The motor vehicle headlamp according to claim 14, wherein said nut member has a concave groove formed on an outer circumference thereof, and wherein said elastic member comprises a push-on fixing washer engaging said concave groove.

17. The motor vehicle headlamp according to claim 14, wherein a side surface of said tool contacts said stationary member when said tool is inserted to engage said gear, thereby pushing said gear in a direction to disengage said opposing surfaces as said tool is inserted.

18. The motor vehicle headlamp according to claim 14, wherein said bearing member comprises a cylindrical member supporting an end portion of said nut member.

19. The motor vehicle headlamp according to claim 14, wherein when said tool is inserted in a direction at a right angle to a longitudinal axis of said aiming screw and teeth of said tool are engaged with said gear, said nut member is slid against a force of said elastic member to disengage said opposing faces and allow said nut member to rotate relative to said bearing.

20. The motor vehicle headlamp according to claim 14, wherein said gear comprises a bevel gear having teeth engageable with said teeth of said tool.

* * * * *